(12) United States Patent
Turner et al.

(10) Patent No.: US 12,015,355 B2
(45) Date of Patent: Jun. 18, 2024

(54) PARALLEL NPC 3-LEVEL INVERTER WITHOUT MIDPOINT CONNECTION OF THE DC-LINKS

(71) Applicant: ABB Schweiz AG, Baden (CH)

(72) Inventors: Robert Turner, Hastings (NZ); Simon Walton, Napier (NZ); Sridhar Pulikanti, Napier (NZ); Arnoud Gerlof Van Der Wal, Napier (NZ); Ian Murray Porteous, Napier (NZ); Nicholas James Elliott, Hastings (NZ)

(73) Assignee: ABB SCHWEIZ AG, Baden (CH)

( * ) Notice: Subject to any disclaimer, the term of this patent is extended or adjusted under 35 U.S.C. 154(b) by 54 days.

(21) Appl. No.: 17/905,057

(22) PCT Filed: Feb. 27, 2020

(86) PCT No.: PCT/EP2020/055172
§ 371 (c)(1),
(2) Date: Aug. 25, 2022

(87) PCT Pub. No.: WO2021/170239
PCT Pub. Date: Sep. 2, 2021

(65) Prior Publication Data
US 2023/0208316 A1 Jun. 29, 2023

(51) Int. Cl.
*H02M 7/493* (2007.01)
*H02M 1/00* (2007.01)

(52) U.S. Cl.
CPC ............ *H02M 7/493* (2013.01); *H02M 1/007* (2021.05)

(58) Field of Classification Search
CPC .. H02M 1/007; H02M 1/0074; H02M 1/0077; H02M 7/487; H02M 7/49; H02M 7/493
See application file for complete search history.

(56) References Cited

U.S. PATENT DOCUMENTS

| 9,331,594 | B2 * | 5/2016 | Gu ....................... H02M 5/4585 |
| 9,595,862 | B1 * | 3/2017 | Fu ....................... H02M 1/0043 |
| 10,186,995 | B2 * | 1/2019 | Dong ....................... H02M 1/32 |
| 2008/0278968 | A1 * | 11/2008 | Srinivasan ............ H02M 7/497 307/77 |
| 2010/0172166 | A1 * | 7/2010 | Singh ................ H02M 7/53871 363/131 |
| 2013/0200715 | A1 * | 8/2013 | Pettersson ............. H02M 7/537 307/82 |

(Continued)

OTHER PUBLICATIONS

Xing Xiangyang, Space Vector Modulation for Circulating Current Suppression Using Deadbeat Control Strategy in Parallel Three-Level Neutral-Clamped Inverter, 2017, IEEE Transactions on Industrial Electronics, vol. 64, pp. 977-987 (Year: 2017).*

(Continued)

*Primary Examiner* — Gary A Nash
(74) *Attorney, Agent, or Firm* — Greenberg Traurig, LLP

(57) ABSTRACT

Embodiments of the present disclosure relate to parallel 3-level inverter without midpoint connection. The parallel 3-level inverter includes a plurality of parallel converters coupled in parallel between a common DC bus and a common AC output, wherein each of the plurality of parallel converters comprises a midpoint and the midpoints of the plurality of parallel converters are disconnected from each other.

9 Claims, 4 Drawing Sheets

(56) References Cited

U.S. PATENT DOCUMENTS

| | | | | |
|---|---|---|---|---|
| 2013/0229838 A1* | 9/2013 | Wang | ............... | H02M 7/493 363/40 |
| 2013/0234641 A1* | 9/2013 | Li | ............... | H02P 27/08 363/34 |
| 2015/0349626 A1* | 12/2015 | Jiang | ............... | H02M 7/44 363/39 |
| 2016/0233776 A1* | 8/2016 | Nielsen | ............... | H02M 3/33546 |
| 2016/0352249 A1* | 12/2016 | Agirman | ............... | B66B 11/0407 |

OTHER PUBLICATIONS

International Search Report and Written Opinion, issued by the ISA/EP European Patent Office, regarding corresponding patent application Serial No. PCT/EP2020/055172; dated Nov. 13, 2020; 14 pages.

Zhangping et al: "Modeling and Elimination of Zero-Sequence Circulating Currents in Parallel Three-Level T-Type Grid-Connected Inverters", IEEE Transactions on Power Electronics, Institute of Electrical and Electronics Engineers, USA; vol. 30, No. 2; Feb. 1, 2015; pp. 1050-1063.

Kai et al: Improved Modulation Mechanism of Parallel-Operated T-Type Three-Level PWM Rectifiers for Neutral-Point Potential Balancing and Circulating Current Suppression; IEEE Transactions on Power Electronics, Institute of Electrical and Electronics Engineers, USA; vol. 33, No. 9; Sep. 1, 2018; pp. 7466-7479.

Ui-Min et al.; Control Strategy of Two Capacitor Voltages for Separate MPPTs in Photovoltaic Systems Using Neutral-Point-Clamped Inverters, IEEE Transactions on Industry Applications, IEEE Service Center, Piscataway, NJ, US; vol. 51, No. 4; Jul. 1, 2015; pp. 3295-3303.

Shen et al; "A Comprehensive Study Neutral-Point Self-Balancing Effect in Neutral-Point-Clamped Three-Level Inverters"; IEEE Transactions on Power Electronics, Institute of Electrical and Electronics Engineers, USA; vol. 26, No. 11; Nov. 1, 2011; pp. 3084-3095.

Xiangyang et al; "Space Vector Modulation for Circulating Current Suppression Using Deadbeat Control Strategy in Parallel Three-Level Neutral-Clamped Inverters"; IEEE Transactions on Industrial Electronics, IEEE Service Center, Piscataway, NJ, USA; vol. 64, No. 2; Feb. 1, 2017; pp. 977-987.

* cited by examiner

PARALLEL NPC 3-LEVEL INVERTER WITHOUT MIDPOINT CONNECTION OF THE DC-LINKS

CROSS-REFERENCE TO RELATED APPLICATIONS

This is a national stage application which claims priority to International patent application Serial No. PCT/EP2020/055172, filed on Feb. 27, 2020; and which is herein incorporated by reference in its entirety.

FIELD

Embodiments of the present disclosure generally relate to the field of electrical field, and in particular, to parallel 3-level inverter without midpoint connection.

BACKGROUND

AC 3-phase converters are increasingly employing 3-level converter topologies as they offer overall increased density and reduced losses. However, the additional voltage level of the DC bus does add an additional degree of complexity.

For typical DC-AC inverter applications the additional DC midpoint is not required for power flow and thus the midpoint is commonly not brought out of the inverter. The DC midpoint does require special consideration, and may require control to keep its voltage balanced.

When paralleling converters, as the converters may be in physically separate enclosures it is desirable to only have to provide interconnecting cables for the points that carry current, and as such it would be preferable to not require a DC midpoint interconnection as under normal operating conditions this wire does not carry any current.

For parallel converter applications the requirement of interconnecting the DC midpoint is not desirable for several reasons. For example, the DC midpoint interconnection does not under normal conditions carry any current, however, any cable would have to be over-current protected and armored for fault conditions. Moreover, each parallel converter may be in its own separate enclosure thus the interconnection of the DC midpoint requires additional connectors and cables between each converter which is both an inconvenience and incurs additional cost.

The state-of-the-art management and balancing of the DC midpoint for a single 3-level converter is well understood. Numerous control techniques are available which allow active balancing of the DC midpoint by use of a common-mode (also known as zero-sequence) voltage between the DC and AC, achieved either at the fundamental or harmonic frequencies, or by exploiting redundant PWM switching vectors.

The conventional techniques are only applicable for singular or parallel converters which have a single common interconnected DC midpoint. The reason for this is that if the DC midpoints are left disconnected, the state-of-the-art control methods in the attempt of balancing a local midpoint in turn unbalance neighboring midpoints.

Accordingly, there is a need for a parallel 3-level inverter without DC midpoint interconnection.

SUMMARY

In general, example embodiments of the present disclosure provide a parallel 3-level inverter without midpoint connection.

In a first aspect, there is provided a parallel 3-level inverter comprising: a plurality of parallel converters coupled in parallel between a common DC bus and a common AC output, wherein each of the plurality of parallel converters comprises a midpoint and the midpoints of the plurality of parallel converters are disconnected from each other.

In a second aspect, there is provided a method for use in a parallel 3-level inverter without DC midpoint connection. The method comprises determining a first average of upper DC bus half voltages of a plurality of parallel converters of the inverter and a second average of lower DC bus half voltages of the plurality of parallel converters; determining a modulation index for each of the plurality of parallel converters based on the first average, the second average, and an AC voltage reference for the converter, such that the upper DC bus half voltages of the plurality of converters are equal to one another and the lower DC bus half voltages of the plurality of converters are equal to one another; and performing a zero-sequence control based on the modulation index to cause the first average of the upper DC bus half voltages to be equal to the second average of the lower DC bus half voltages.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
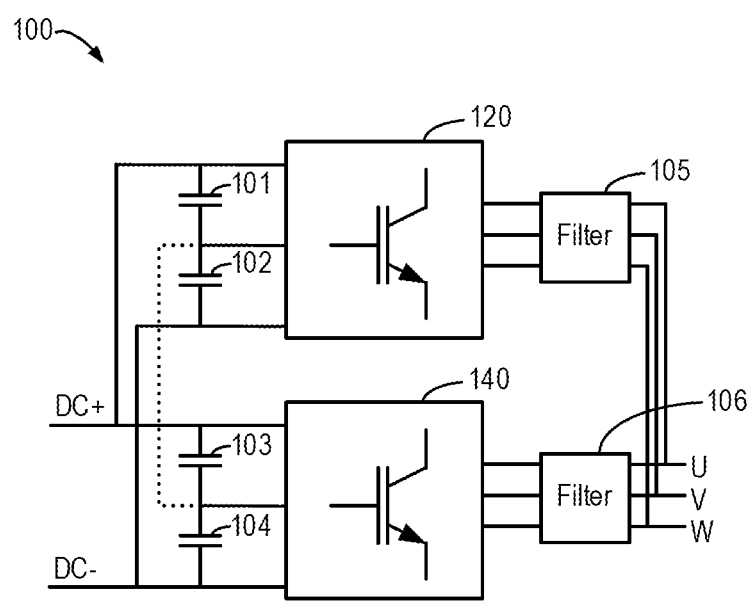
FIG. 1 shows a circuit diagram illustrating a parallel 3-level inverter without midpoint interconnection in accordance with an embodiment of the present disclosure.

FIG. 1 shows a circuit diagram illustrating a parallel 3-level inverter 100 without midpoint interconnection in accordance with some embodiments of the present disclosure. The parallel 3-level inverter 100 is coupled to a DC bus, including a positive supply rail DC+ and a negative supply rail DC−. The parallel 3-level inverter 100 converts the DC voltage on the DC bus to an AC output voltage, including three phases U, V, W. The parallel 3-level inverter 100 includes a first 3-level converter 120 and a second 3-level converter 140. It is to be understood that the parallel 3-level inverter 100 can include more than two 3-level converters.

As shown in FIG. 1, an upper DC bus capacitor 101 and a lower DC bus capacitor 102 is coupled across the DC bus and a first DC midpoint (the common node of the upper DC bus capacitor 101 and the lower DC bus capacitor 102) is coupled to the first 3-level converter 120. In addition, the upper DC bus capacitor 103 and the lower DC bus capacitor 104 are coupled across the DC bus and a second DC midpoint (the common node of the upper DC bus capacitor 103 and the lower DC bus capacitor 104) is coupled to the second 3-level converter 140. The first DC midpoint is not coupled to the second DC midpoint, as shown by the dotted line in FIG. 1.

The output of the first 3-level converter 120 is coupled to a filter 105, which is coupled to the AC output. The output of the second 3-level converter 140 is coupled to a filter 106, which is also coupled to the AC output.

Ideally it is desirable to do both active balancing with respect to each other (that is local balancing) and active balancing globally in the inverter 100. However, in practice, it is not possible to do so. The only "lever" for active balancing is a voltage-offset (commonly known as common-mode or zero-sequence voltage) on the modulation index. This could be used to achieve active balancing globally but typically not with respect to each other. The main reason it cannot be used with respect to each other is that, because the converters are connected together in parallel (inputs and outputs are tied together), then the converters should not have different common-mode voltages.

Instead, embodiments of the present disclosure advantageously achieve natural balancing with respect to each other but also active balancing globally. This approach is ideal in every sense. For example, active balancing globally can be used which allows the parallel converters to be used in many applications, and then the inter-converter (with respect to each other) can use the simple (not extra control) natural balancing.

Figure 2:
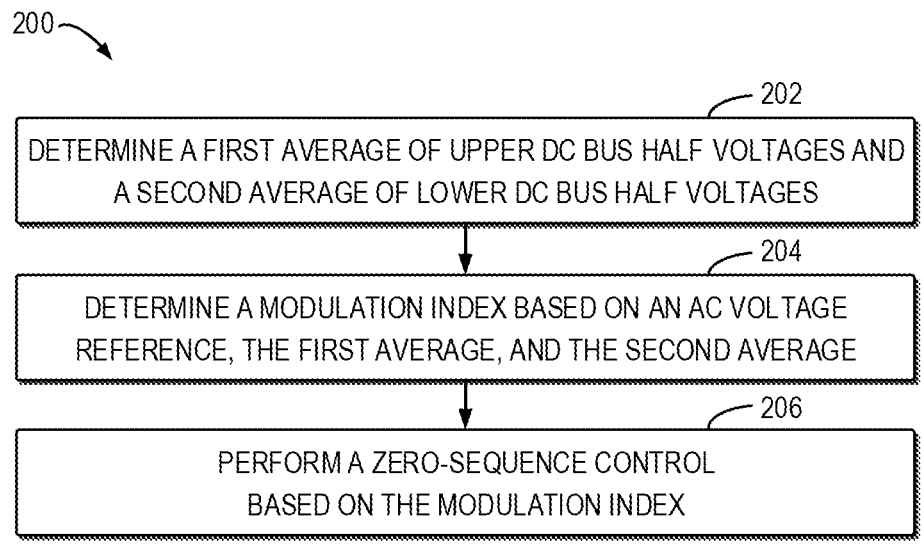
FIG. 2 shows a flowchart illustrating a method for use in the parallel 3-level inverter in accordance with an embodiment of the present disclosure.

FIG. 2 shows a flowchart illustrating a method 200 for use in the parallel 3-level inverter 100. Method 200 may be implemented at a single common controller and may also be implemented at each converter of the parallel 3-level inverter 100. Reference now is made to a single common controller and it is to be understood that method 200 can also be applied to other controller arrangement.

At block 202, the common controller determines a first average of upper DC bus half voltages of the parallel converters of the inverter 100 and a second average of lower DC bus half voltages of the parallel converters of the inverter 100. For example, each converter 120, 140 can measure its upper and lower DC bus halves with voltage sensors. The common controller may be communicatively coupled to each converter and obtain the voltage measurements from the converters to calculate the averages. Each converter can receive the first average and the second average calculated at the common controller. Alternatively, each converter can receive each of the other converter DC bus half voltages and perform the averaging locally.

In the case of the inverter 100, the first average of upper DC bus half voltages of the parallel converters of the inverter 100 is the average of the upper DC bus half voltage of the first converter 120 and the upper DC bus half voltage of the second converter 140. In the case of the inverter 100, the second average of lower DC bus half voltages of the parallel converters of the inverter 100 is the average of the lower DC bus half voltage of the first converter 120 and the lower DC bus half voltage of the second converter 140.

At block 204, each converter of the inverter 100 determines a modulation index based on the first average, the second average, and an AC voltage reference for the converter, such that the upper DC bus half voltages of the plurality of converters are equal to one another and the lower DC bus half voltages of the plurality of converters are equal to one another. In this way, each converter decouples its PWM output voltage using the averaged DC bus-half voltages and a "natural" DC midpoint balancing is achieved. By decoupling by the average DC bus halves, if one converter has a local DC midpoint unbalance which differs from the global average unbalance it then will experience a local "natural" DC midpoint balancing but only with respect to the other parallel converters.

The key point of decoupling is that a PWM reference (a modulation index) is simply a ratio of the AC output voltage to the DC bus voltage. If it is desired to produce a specific AC voltage then the DC bus voltage has to be decoupled. For example for a simple 2-level converter, if the DC bus voltage is 100V and if an output AC voltage is sine-waves with a peak-to-peak voltage of 100V, then a modulation index is equal to 1.0. If the DC bus voltage increases to 125V but the same output voltage is needed, then the modulation index should be recalculated to be 100V/125V=0.8

$V_{upper}$ and $V_{lower}$ are the measured upper and lower bus voltage halves, respectively. The sum of the upper and lower bus voltage halves is the total or summed bus voltage. Midpoint unbalance is introduced with respect to what a balanced voltage would be. A balanced midpoint voltage is when the upper and lower bus halves are equal. The bus half voltage averages can be called $V_{upper\_avg}$ and $V_{lower\_avg}$.

"Local midpoint unbalance" means a deviation of the actual mid-point voltage of a converter from the half the total bus voltage. Mathematically speaking, $V_{busTotal}=V_{lower}+V_{upper}$ and $V_{unbalance}=V_{lower}-(V_{busTotal}/2)$.

For example, if the $V_{lower}=2V$ and $V_{upper}=1V$, then the $V_{busTotal}=3V$. The midpoint is unbalanced because the $V_{lower}$ is greater than $V_{upper}$. $V_{unbalance}=2-(3/2)=0.5V$ In an example, two converters are unbalanced with respect to each other but balanced globally: $V_{upper\_1}=1V$, $V_{lower\_1}=2V$, $V_{upper\_2}=2V$, $V_{lower\_2}=1V$. Here $V_{total}=3V$. The "upper bus voltage average" is $1.5V=V_{upper\_avg}=(V_{upper\_1}+V_{upper\_2})/2$. The "lower bus voltage average" is also $1.5V=V_{lower\_avg}=(V_{lower\_1}+V_{lower\_2})/2$. The average bus halves are equal and so the converter is balanced globally. The individual converter halves are unbalanced with respect to each other because their individual upper (and also lower) half voltages are not the same as the averages.

In another example, two converters are balanced with respect to each other but unbalanced globally: $V_{upper\_1}=1V$, $V_{lower\_1}=2V$, $V_{upper\_2}=1V$, $V_{lower\_2}=2V$. Again $V_{total}=3V$. $V_{upper\_avg}=1V$, $V_{lower\_avg}=2V$. The average bus halves are different and so the converter is unbalanced globally. The individual upper converter halves are the same as the averages: $V_{upper\_1}=V_{upper\_2}=$V_upper_avg, and also $V_{lower\_1}=V_{lower\_2}=V_{lower\_avg}$. So the converter is balanced locally.

The term "natural DC midpoint balancing but only with respect to the other parallel converters" means that use natural balancing with respect to each other, but not globally. So the natural balancing will result in $V_{lower\_1}=V_{lower\_2}=V_{lower\_avg}$ and $V_{upper\_1}=V_{upper\_2}=V_{upper\_avg}$. But the natural balancing is not used for global balancing.

Figure 3:
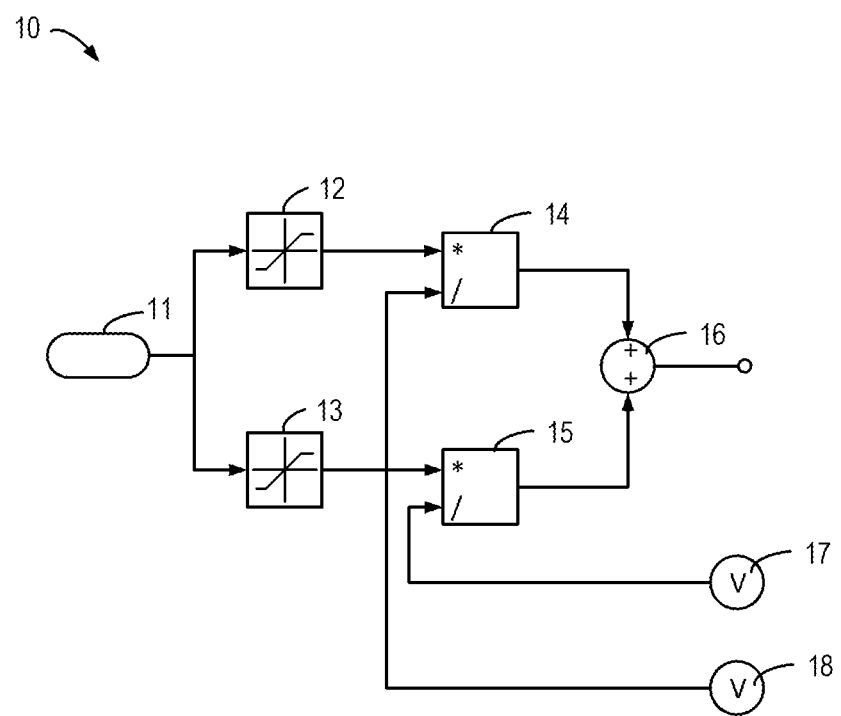
FIG. 3 shows a DC bus decoupling block in accordance with an embodiment of the present disclosure.

FIG. 3 shows a block diagram of DC bus decoupling 10 in accordance with an embodiment of the present disclosure. The AC voltage reference 11 is provided into two limiters 12 and 13. The limiter 12 has a lower limit of zero and the limiter 13 has an upper limit of zero. The voltage 17 is the first average of upper DC bus half voltages of the converters and the voltage 18 is the second average of lower DC bus half voltages of the converters. If the AC voltage reference 11 is greater than zero, the AC voltage reference 11 will be provided via the limiter 12 into the divider 14, which divides the positive AC voltage reference by the voltage 18. If the AC voltage reference 11 is less than zero, the AC voltage reference 11 will be provided via the limiter 13 into the divider 15, which divides the negative AC voltage reference by the voltage 17. The outputs of the dividers 14 and 15 are summed at adder 16 to obtain a modulation index for use in controlling the converter.

Figure 4:
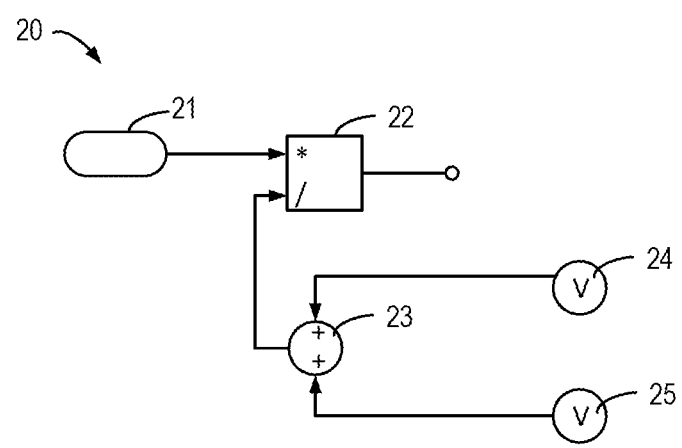
FIG. 4 shows a DC bus decoupling block in accordance with another embodiment of the present disclosure.

FIG. 4 shows a block diagram of DC bus decoupling 20 in accordance with an embodiment of the present disclosure. The voltage 24 is the first average of upper DC bus half voltages of the converters and the voltage 25 is the second average of lower DC bus half voltages of the converters. The voltages 24 and 25 are summed at adder 23 to be a summed voltage. The AC voltage reference 21 and the summed voltage are provided into the divider 22, which divides the AC voltage reference 21 by the summed voltage to obtain a modulation index for use in controlling the converter.

While there is natural balancing of each converters midpoints with respect to the average midpoint balance, the average decoupling still results in no overall average midpoint balancing, and thus a global midpoint balancing control mechanism is required. To this end, at block 206, a zero-sequence control can be performed based on the modulation index to cause the first average of the upper DC bus half voltages to be equal to the second average of the lower DC bus half voltages. For example, an overall midpoint controller is implemented based on the average DC bus midpoint unbalance, and the reference from the balancing controller is distributed equally to all the converters. The global active balancing controller can only vary the common-mode voltage. The common-mode voltage is the sum of all 3 of the 3-phase voltage references. Usually this voltage is zero. In 3-wire AC systems power is transferred between the 3-phases and a common-mode voltage does not affect operation as there is no common-mode current path.

The balancing controller may be implemented in a single controller and then its reference distributed to each converter. Traditional midpoint balancing control algorithms may be employed for the global DC midpoint balancing. Parallel converters may be used in high-reliability applications where the loss of one of the converters in the parallel group is tolerable. Redundancy only works if the loss of one part of the system (for example one of the converters) does not stop the remaining ones. In this case, a single point of failure is not tolerable and the controller may be replicated in each converter.

According to embodiments of the present disclosure, the way to allow natural balancing with respect to each other (natural balancing has no individual decoupling) but then for active balancing globally (which does require individual decoupling) is for each converter to locally decouple their voltage reference not from their measured DC bus halves, but instead from the average DC bus halves. For example, if one converter upper DC bus half is lower than the average upper DC bus half, when that converter decouples by the upper average DC bus half it will effectively be decoupling by the wrong voltage (because its upper DC bus half is lower than the average) and so will achieve natural balancing. But because all of the converters are decoupling by the averages then any active balancing which operates on the averages (which is the global balance) will be able to balance the global. In this way, method 200 enables inter-converter midpoint balancing (using natural balancing) and allows global active balancing and it is not necessary to connect the midpoints of the parallel converters.

In some embodiments, each converter can measure a zero-sequence current for each of the plurality of parallel converters and control the zero-sequence current to zero. In other words, each converter locally attempts to cancel any zero-sequence currents using a local feedback controller. Zero-sequence currents act to cause unbalance, so cancelling any erroneous zero-sequence currents removes a source of midpoint unbalance.

According to embodiments of the present disclosure, each converter decouples the DC bus voltage by the DC bus half averages, allowing the use of active global balancing and relying on natural balancing to achieve inter-converter balancing. The benefit is immediately apparent in that there are no cable connections required between each converters DC midpoint thereby reducing system cabling costs and complexity. The method has been demonstrated to be insensitive to the practical realities of component variations and sensing errors of parallel converters. In addition, embodiments of the present disclosure enable four-quadrant operation of parallel 3-level converters without the DC midpoints connected.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

We claim:

1. A parallel 3-level inverter comprising:
    a plurality of parallel converters coupled in parallel between a common DC bus and a common AC output, wherein each of the plurality of parallel converters comprises a midpoint and the midpoints of the plurality of parallel converters are disconnected from each other; and
    one or more controllers configured to:
        determine a first average of upper DC bus half voltages of the plurality of parallel converters and a second average of lower DC bus half voltages of the plurality of parallel converters;
        determine a modulation index for each of the plurality of parallel converters based on the first average, the second average, and an AC voltage reference for each of the plurality of parallel converters, such that the upper DC bus half voltages of each of the plurality of parallel converters are equal to one another and the lower DC bus half voltages of each of the plurality of parallel converters are equal to one another; and perform a zero-sequence control based on the modulation index to cause the first average of the upper DC bus half voltages to be equal to the second average of the lower DC bus half voltages.

2. The parallel 3-level inverter of claim 1, wherein: the common DC bus comprises a positive supply rail and a negative supply rail, each of the plurality of parallel converters comprising a first input electrically coupled to the positive supply rail and a second input electrically coupled to the negative supply rail and the midpoint of each of the plurality of parallel converters is capacitively coupled to each of the positive supply rail and the negative supply rail.

3. The parallel 3-level inverter of claim 1, wherein the one or more controllers are configured to:

measure a zero-sequence current for each of the plurality of parallel converters; and control the zero-sequence current to zero.

4. The parallel 3-level inverter of claim 1, wherein the one or more controllers are configured to:

divide the AC voltage reference by a sum of the first average of the upper DC bus half voltages and the second average of the lower DC bus half voltages to determine the modulation index.

5. The parallel 3-level inverter of claim 1, wherein the one or more controllers are configured to:

if the AC voltage reference is less than zero, divide the AC voltage reference by the first average of the upper DC bus half voltages; and if the AC voltage reference being greater than zero, divide the AC voltage reference by the second average of the lower DC bus half voltages.

6. A method for use in a parallel 3-level inverter without DC midpoint connection, the method comprising:

determining a first average of upper DC bus half voltages of a plurality of parallel converters of the inverter and a second average of lower DC bus half voltages of the plurality of parallel converters;

determining a modulation index for each of the plurality of parallel converters based on the first average, the second average, and an AC voltage reference for the plurality of parallel converters, such that the upper DC bus half voltages of the plurality of parallel converters are equal to one another and the lower DC bus half voltages of the plurality of parallel converters are equal to one another; and performing a zero-sequence control based on the modulation index to cause the first average of the upper DC bus half voltages to be equal to the second average of the lower DC bus half voltages.

7. The method of claim 6, further comprising:

measuring a zero-sequence current for each of the plurality of parallel converters; and controlling the zero-sequence current to zero.

8. The method of claim 6, wherein determining the modulation index comprises:

dividing the AC voltage reference by a sum of the first average of the upper DC bus half voltages and the second average of the lower DC bus half voltages.

9. The method of claim 6, wherein determining the modulation index comprises:

if the AC voltage reference is less than zero, dividing the AC voltage reference by the first average of the upper DC bus half voltages; and if the AC voltage reference being greater than zero, dividing the AC voltage reference by the second average of the lower DC bus half voltages.

* * * * *